Dec. 9, 1924.
J. D. FINNEGAN
TIRE CHAIN
Filed Oct. 13, 1923
1,518,645
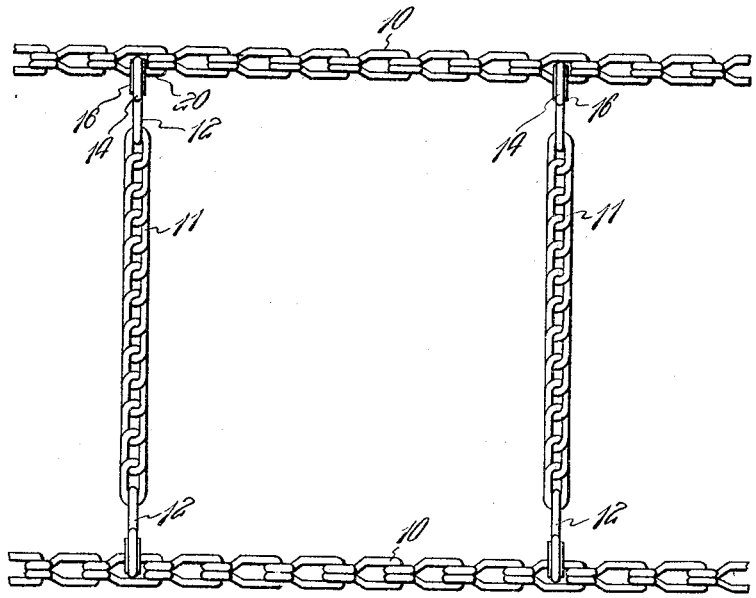
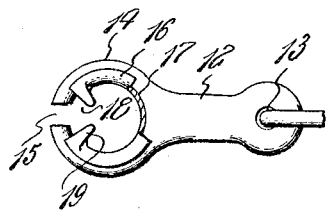
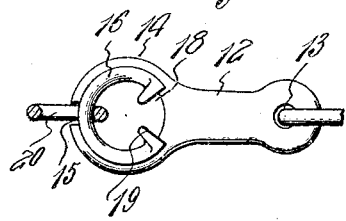
J. D. Finnegan
INVENTOR
BY Victor J. Evans
ATTORNEY Patented Dec. 9, 1924.

1,518,645

UNITED STATES PATENT OFFICE.

JOHN D. FINNEGAN, OF NEWCOMB, NEW YORK.

TIRE CHAIN.

Application filed October 13, 1923. Serial No. 668,431.

*To all whom it may concern:*

Be it known that I, JOHN D. FINNEGAN, a citizen of the United States, residing at Newcomb, in the county of Essex and State of New York, have invented new and useful Improvements in Tire Chains, of which the following is a specification.

This invention relates to anti-skid chains for automobile wheels, or the like, and contemplates a new and novel means whereby the tread chains can be quickly and conveniently attached to or removed from the side chains when desired, the invention residing in the construction, combination and arrangement of parts as claimed.

In the drawing forming part of this application, like numerals of reference indicate similar parts in the several views, and wherein:

Figure 1 is a fragmentary plan view of the anti-skid device.

Figure 2 is an enlarged view partly in section of the fastening means forming the subject matter of the invention.

Figure 3 is a detailed view of the locking ring.

Figure 4 is a view similar to Figure 2 but showing the position occupied by the locking ring 16 to prevent casual separation of the parts of the chain.

Referring to the drawing in detail, 10 indicates the side chains of the anti-skid device, these chains being adapted to be arranged at the opposite sides of the wheel not shown, and which side chains are connected by equi-distantly spaced independent tread chains 11. The present invention resides in the means utilized to secure each tread chain with the opposite side chains, so that the tread chains can be independently attached to or removed from the side chains in a quick and convenient manner.

The fastening means above referred to consists of an elongated plate 12, one of which is connected with each end of each cross or tread chain 11, the plate 12 having an opening 13 at one end to receive the adjacent link of the tread chain 11. The outer end of each plate 12 terminates to provide an enlarged circular portion 14 which is open as at 15 to receive one of the links of the adjacent side chain 10. Arranged within the enlarged circular portion 14 of each fastening device is a split or open locking ring 16, the latter being formed with a groove 17 which receives the inner periphery of the circular portion 14 as shown. This locking ring is open as at 18, and the adjacent ends of said ring at opposite sides of the opening 18 terminates to provide inwardly projecting lugs 19 which prevents the ring from turning to an open position after it has been turned to a locked position. In order to associate the tread chains 11 with one of the side chains 10, it is only necessary to arrange the opening 18 of the locking ring to coincide with the opening 15 of the enlarged circular portion 14 of the plate 12, whereupon the link 20 of the side chain can be passed through said openings into the locking ring 16. The ring 16 can then be turned to bridge the opening 15 of the enlarged circular portion 14 of the plate 12 to prevent any casual separation of the parts, the ring 16 being snugly associated with the enlarged circular portion 14 so that it cannot move of its own accord to an open position. The lugs 19 on the locking ring not only prevent the ring from being moved to a position, which would allow the side chain to be casually separated from the cross chain under any circumstances, but these lugs are also useful to facilitate turning of the ring 19 as the occasion requires, as a screw driver or any other instrument can be arranged against the lugs to turn the ring in one or the other direction, the fastening means not only prevents separation of the parts when once connected, but is designed to allow the parts to be quickly assembled or disassembled when desired.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, 1 claim:

A fastening device of the character described comprising an elongated plate having a split annular portion at one end, a split locking ring wholly arranged within the annular portion, and having its outer periphery grooved to receive the inner periphery of said annular portion, whereby said locking-ring is mounted for rotation within said annular portion, and inwardly extending lugs projecting from the adjacent ends of the split locking ring, said lugs being convergently disposed and adapted to be arranged at a point diametrically opposite the space between the ends of the annular portion of the plate when the locking ring is in a position for use.

In testimony whereof I affix my signature.

JOHN D. FINNEGAN.